US012373779B2

(12) United States Patent
Sreekumar et al.

(10) Patent No.: US 12,373,779 B2
(45) Date of Patent: Jul. 29, 2025

(54) BLOCKCHAIN-ENABLED SECURE INFORMATION PAYLOAD PACKET (SIPP) TECHNOLOGY FOR REAL-TIME MULTI-TIER DATA SHARING WITHIN MULTI-PARTY SYSTEMS

(71) Applicants: Rakesh Sreekumar, Austin, TX (US); Sunil C. Cherian, Mountain House, CA (US); Ashutosh Arvind Kapuskar Kapuskar, Sunnyvale, CA (US); Ashutosh Pande, Sunnyvale, CA (US)

(72) Inventors: Rakesh Sreekumar, Austin, TX (US); Sunil C. Cherian, Mountain House, CA (US); Ashutosh Arvind Kapuskar Kapuskar, Sunnyvale, CA (US); Ashutosh Pande, Sunnyvale, CA (US)

(*) Notice: Subject to any disclaimer, the term of this patent is extended or adjusted under 35 U.S.C. 154(b) by 279 days.

(21) Appl. No.: 18/131,875

(22) Filed: Apr. 7, 2023

(65) Prior Publication Data
US 2024/0112132 A1 Apr. 4, 2024

Related U.S. Application Data

(60) Provisional application No. 63/328,731, filed on Apr. 7, 2022.

(51) Int. Cl.
*G06Q 10/087* (2023.01)
*H04L 65/1104* (2022.01)
(52) U.S. Cl.
CPC ........ *G06Q 10/087* (2013.01); *H04L 65/1104* (2022.05)

(58) Field of Classification Search
CPC ................ G06Q 10/087; H04L 65/1104
See application file for complete search history.

(56) References Cited

U.S. PATENT DOCUMENTS

| | | | | |
|---|---|---|---|---|
| 5,588,060 | A * | 12/1996 | Aziz ................. | H04L 63/061 380/30 |
| 8,689,328 | B2 * | 4/2014 | Ormazabal ......... | H04L 63/1458 726/22 |
| 10,049,407 | B2 * | 8/2018 | Bradshaw .......... | G06Q 20/102 |
| 10,931,672 | B1 * | 2/2021 | Dequeiroga ....... | H04L 63/0884 |
| 11,823,121 | B2 * | 11/2023 | Moore .............. | H04L 9/3239 |
| 11,829,942 | B2 * | 11/2023 | Yund ................ | H04L 9/50 |
| 2018/0115425 | A1 * | 4/2018 | Dechu .............. | H04L 9/3239 |
| 2020/0349274 | A1 * | 11/2020 | Miller .............. | G06Q 20/4016 |
| 2021/0158370 | A1 * | 5/2021 | Koudall ............ | G06Q 10/00 |

(Continued)

*Primary Examiner* — Michael Jared Walker

(57) ABSTRACT

In one aspect, a computerized method for a blockchain-enabled secure information payload packet (SIPP) architecture, technology, and protocol for real-time multi-tier data sharing within multi-party systems, such as a plurality of supply chains, according to some embodiments comprising: providing an N-tier supplier network implemented with the blockchain-enabled secure information payload packet SIPP technology, wherein the N-tier supplier network comprises a decentralized data network and enables a plurality of different modalities of data sharing between network members in a tier-aware manner, and wherein the N-tier supplier network records data on a common blockchain ledger; providing a Secure Data Vault (SDV); and implementing the blockchain-enabled Secure Information Payload Packet (SIPP) protocol and the SDV in a Smart Utility Tokens (SUT) context.

20 Claims, 14 Drawing Sheets

(56) References Cited

U.S. PATENT DOCUMENTS

| | | | | |
|---|---|---|---|---|
| 2021/0314293 A1* | 10/2021 | Soundararajan | ........ | H04L 63/10 |
| 2022/0006651 A1* | 1/2022 | Soundararajan | .... | H04W 12/069 |
| 2022/0292617 A1* | 9/2022 | Cassoli | ................. | G06Q 50/04 |
| 2023/0088936 A1* | 3/2023 | Chalkley | ............... | H04L 9/3213 |
| | | | | 705/26.81 |
| 2023/0306141 A1* | 9/2023 | Ramaiah | ............... | G06F 9/4416 |

* cited by examiner

BLOCKCHAIN-ENABLED SECURE INFORMATION PAYLOAD PACKET (SIPP) TECHNOLOGY FOR REAL-TIME MULTI-TIER DATA SHARING WITHIN MULTI-PARTY SYSTEMS

CLAIM OF PRIORITY

This application claims priority to the U.S. Provisional Patent Application No. 63/328,731, filed on 7 Apr. 2022, and titled BLOCKCHAIN-ENABLED SECURE INFORMATION PAYLOAD PACKET (SIPP) TECHNOLOGY AND OTHER METHODS AND SYSTEMS. This provisional patent application is hereby incorporated by reference in its entirety.

BACKGROUND

It is noted that N-tier visibility of data is a key prerequisite for multi-tier, multi-party system planning, orchestration, and risk and resilience management. The overall level of supply chain visibility to a great extent depends on the ability and willingness of the suppliers in the network to share relevant data across tiers. with you. Further, if this data is recorded within a common database, the participants may have instant access to relevant data and avoid the need for cumbersome reconciliation and the potential for any dispute. There are considerable barriers today, that deter or prevent suppliers from sharing data readily across tiers. Some of these barriers include, inter alia: a lack of trust in sharing data within any database that someone else controls; a lack of connectivity or established information pathways to share data; a need for privacy or reluctance to share identifiable and other sensitive information; and a lack of adequate governance to ensure network policies and contracts compliance.

Three questions can be associated with the digitization of physical data—how to ensure that the event happened, how to ensure that the digitized data's integrity is assured and not tampered with and how to ensure that the same event is not duplicated into the same network or even other networks (e.g. akin to the double spend problem with money). For example, simultaneously creating a physical object and its digital version. A user can then use the timestamp to show that it is indeed the first act of digitization of the asset. However, nothing prevents a user from changing or manipulating the original data or taking a slightly different picture or video and/or combining that with other information and creating another version out of the same original. Various approaches that have been proposed include destroying the original, locking up the original, sending the original with the digital version for human verification etc.

SUMMARY OF THE INVENTION

In one aspect, a computerized method for a blockchain-enabled secure information payload packet (SIPP) architecture, technology, and protocol for real-time multi-tier data sharing within multi-party systems such as a plurality of supply chains, according to some embodiments comprising: providing an N-tier supplier network implemented with the blockchain-enabled secure information payload packet SIPP technology, wherein the N-tier supplier network comprises a decentralized data network and enables a plurality of different modalities of data sharing between network members in a tier-aware manner, and wherein the N-tier supplier network records data on a common blockchain ledger; providing a Secure Data Vault (SDV); and implementing the blockchain-enabled Secure Information Payload Packet (SIPP) protocol and the SDV in a Smart Utility Tokens (SUT) context.

Figure 1:
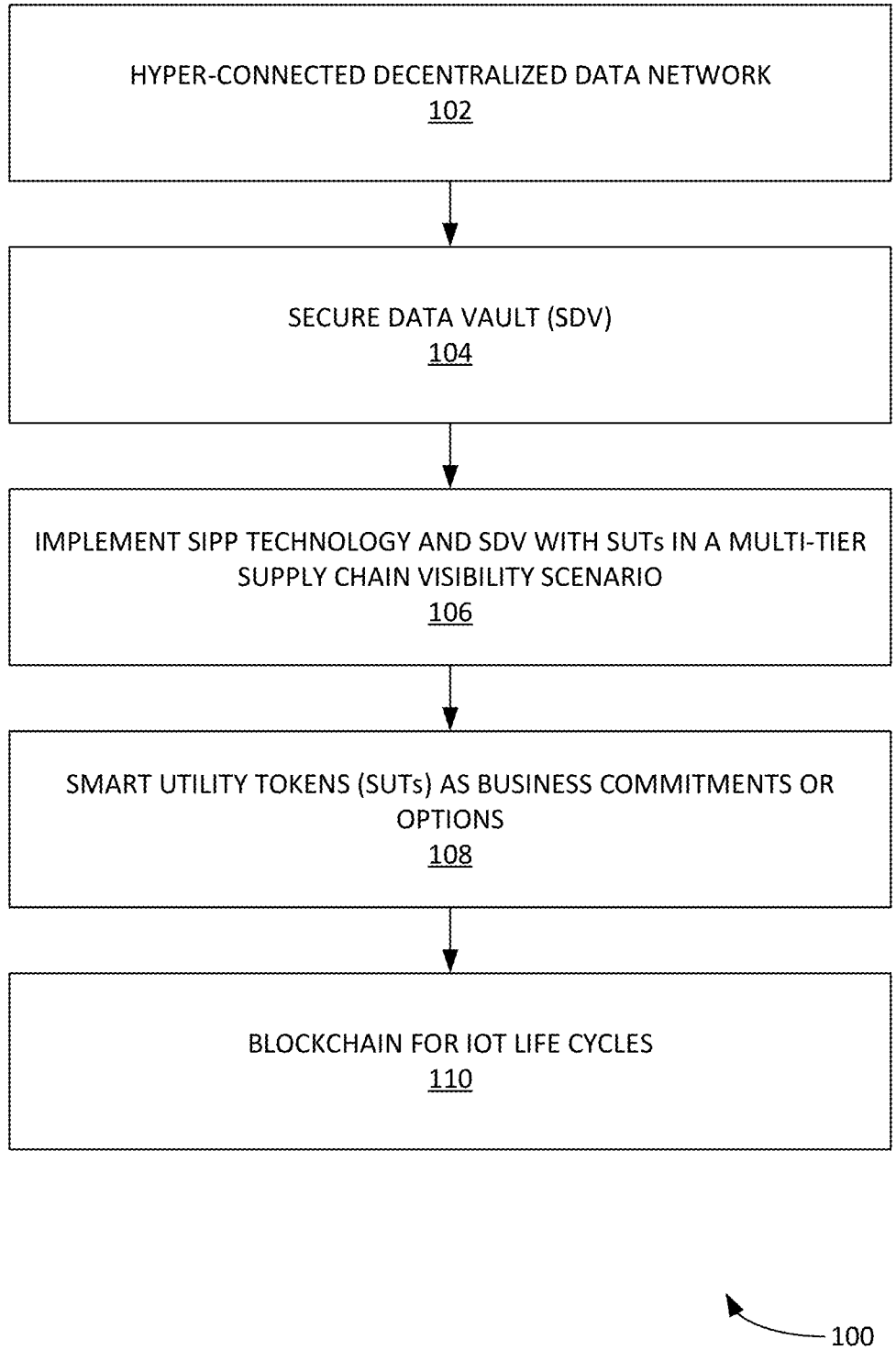
FIG. 1 illustrates an example process for blockchain-enabled secure information payload packet (SIPP) technology for real-time multi-tier data sharing within multi-party systems such as supply chains, according to some embodiments.

The Figures described above are a representative set and are not exhaustive with respect to embodying the invention.

DESCRIPTION

Disclosed are a system, method, and article of manufacture for various blockchain-enabled technologies. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment', 'an embodiment,' 'one example,' or similar language means that a particular feature, structure, or characteristic described in connection with the embodiment is included in at least one embodiment of the present invention. Thus, appearances of the phrases 'in one embodiment', 'in an embodiment,' and similar language throughout this specification may but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of the embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Blockchain is a growing list of records, called blocks, that are linked together using cryptography. Each block contains a cryptographic hash of the previous block, a timestamp, and transaction data (e.g. represented as a Merkle tree). The timestamp proves that the transaction data existed when the block was published to determine its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks.

Cloud computing can involve deploying groups of remote servers and/or software networks that allow centralized data storage and online access to computer services or resources. These groups of remote servers and/or software networks can be a collection of remote computing services.

Data Veracity Score: In enterprises, every piece of data needs to be trusted (e.g. data that originates from outside the organization say from suppliers, partners, etc.). Trust or trustworthiness of data is a composite, multi-factorial concept that needs to take into account multiple factors such as the verifiability of the source, the completeness of data, method of data collection, the type and quality of proofs provided, whether an independent audit was done on the data, the recency of the data provided, the provenance of data provided and the basis of calculations/computations, as applicable, to name a few. Also, not all data has the same level of verifiability associated with it and hence not all data is equally trustworthy or truthful (e.g. some data may have been manually entered data, some may have a paper trail to back it up, some may have data extracted from an application via APIs and some may have data coming in from a machine or a sensor). Each of these examples presents increasing levels of verifiability and veracity. An algorithm can assess the proofs associated with each data on the blockchain and generates a veracity score for each data. On top of it, the algorithm also prints the veracity score on the Proof of Verification (PoV) certification that we generate for any data (PoV is already covered in the application).

Digital wallet is an electronic device, online service, or software program that allows one party to make electronic transactions with another party bartering digital currency units for goods and services. Digital wallets can work online and offline—i.e, people can transact with each other using these wallets in places with or without internet connectivity.

Internet of Things (IoT) describes physical objects (or groups of such objects) that are embedded with sensors, processing ability, software, and other technologies that connect and exchange data with other devices and systems over the Internet or other communications networks.

Non-fungible token (NFT) is a unique and non-interchangeable unit of data stored on a digital ledger (e.g. a blockchain as defined supra).

Offline wallet can be digital wallet that work online and offline. For example, users can transact with each other using these wallets in places with or without Internet and/or other computer network connectivity.

Public Key Infrastructure (PKI) is a set of roles, policies, hardware, software, and procedures needed to create, manage, distribute, use, store, and revoke digital certificates and manage public-key encryption. A PKI is to facilitate the secure electronic transfer of information for a range of network activities such as e-commerce, internet banking, and confidential email. A PKI can be used for activities where simple passwords are not an inadequate authentication method and more rigorous proof is required to confirm the identity of the parties involved in the communication and to validate the information being transferred.

Secure Information Packet Protocol (SIPP) architecture and technology is an approach for complex business networks such as multi-tiered supply chains to help the network participants to share data across tiers in a secure, controlled, targeted, and tier-aware manner. Tier awareness refers to the layering of relationships wherein a network participant is aware of where they fit within the N-tier chain and what relationships and interactions they can have with other participants above, within, and below their position within the chain. The Secure Information Packet Protocol can be a data-sharing protocol for complex business networks such as multi-tiered supply chains to help the network participants to share data across tiers in a secure, controlled, targeted, and tier-aware manner.

A smart contract is a computer program or a transaction protocol that is intended to automatically execute, control or document legally relevant events and actions according to the terms of a contract or an agreement.

Vendor-Managed Inventory (VMI) is an inventory management practice in which a supplier of goods, is responsible for optimizing the inventory held by its customer, usually the manufacturer.

Zero-Knowledge Proof (ZKP) is a method by which one party (the prover) can prove to another party (e.g. the verifier) that a given statement is true, without conveying any information apart from the fact that the statement is indeed true.

Blockchain-Enabled Secure Information Payload Protocol (SIPP) Technology

A blockchain-enabled solution for blockchain-enabled N-tier supplier network(s) is provided. The blockchain-enabled N-tier supplier network enables participants across all tiers to share data across the supply chain in a secure, and efficient manner. The blockchain-enabled N-tier supplier network utilizes Secure Information Payload Protocol (SIPP) technology that enables complex, multi-tier supply chains to overcome the various barriers to data sharing and collaboration between all participants by improving connectivity, security, privacy, data integrity, and trust, while also laying the foundation for enabling innovative business and supply chain financing models. The SIPP technology includes the following provided infrastructure.

Figure 2:
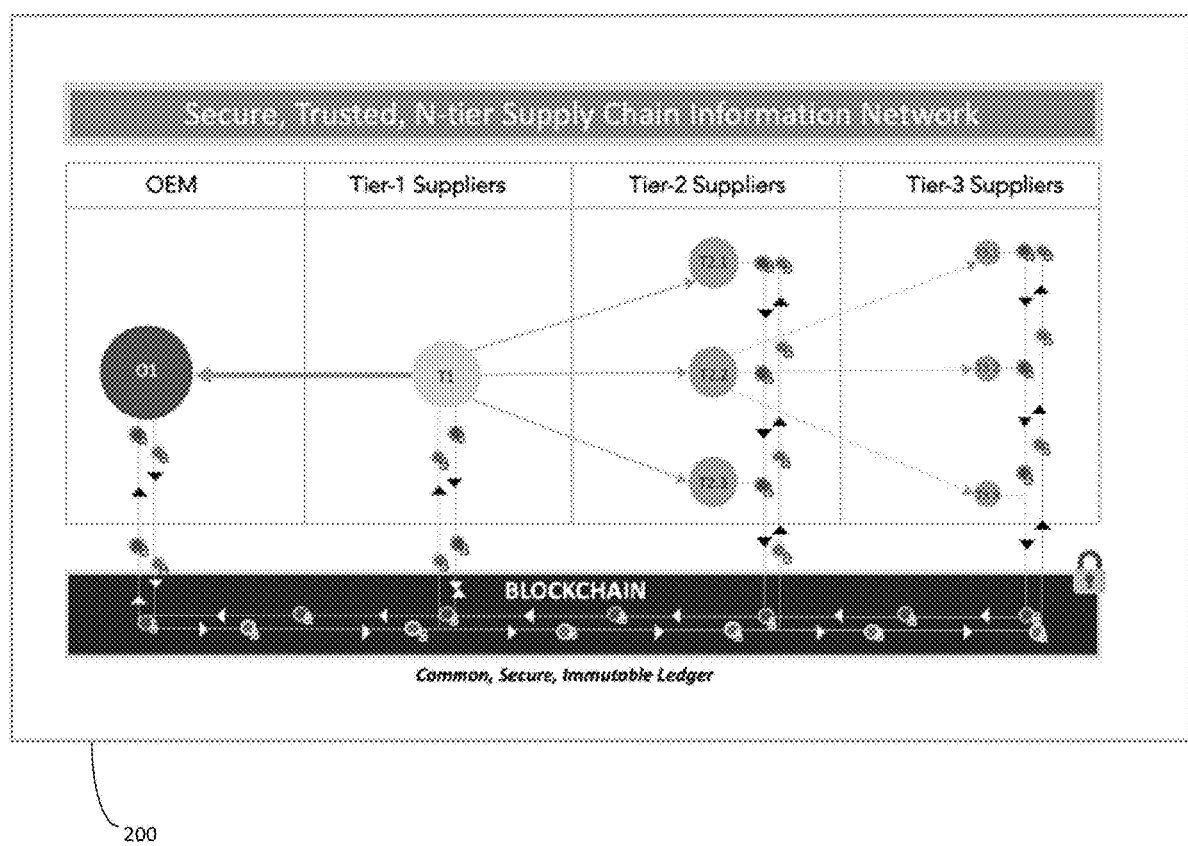
FIG. 2 illustrates an example blockchain-enabled N-tier supplier network, according to some embodiments.

FIG. 1 illustrates an example process 100 for blockchain-enabled secure information payload packet (SIPP) technology for real-time multi-tier data sharing within multi-party systems such as supply chains, according to some embodiments. In step 102, process 100 provides a hyper-connected decentralized data network. The network for examples can include an Original Equipment Manufacturer (OEM) and the various tiers of suppliers with each tier supplying goods or services to serve the upstream tiers—for example The OEM could be an Aut Manufacturer, a tier 1 supplier could be the engine supplier, a tier-2 supplier could be one supplying engine pistons or other engine parts, and a tier 3 supplier could be the one supplying cast iron or steel to the tier-2 supplier mentioned in this example. Thus there could be many tiers depending on the product, and the constituent components. FIG. 2 illustrates an example blockchain-enabled N-tier supplier network 200, according to some embodiments. N-tier supplier network 200 can include a hyper-connected decentralized data network. The N-tier supplier network 200 can be implemented with SIPP technology. The hyper-connected data network can allow different modalities of data sharing between network members in a tier-aware manner. By enabling these information pathways, participants can share data with individuals or multiple participants, as required, across multiple tiers. N-tier supplier network 200 can also enable data to be recorded on a common blockchain ledger, which serves as the common decentralized store for verifiable, immutable data. Data-sharing rules can be encoded within smart contracts to ensure direct and targeted tier-aware communications, embed business logic, reduce information latency and improve information accuracy through automation.

The blockchain ledger can serve as a common, single source of truth for all the data in the network and enables all participants to selectively share cryptographically signed and secured data with relevant participants, and/or without compromising on their privacy or by giving up control of their data.

In this way, the relevant information regarding every supplier in the supply chain, including their capacity, parts/material availability, quality, capability, risk management practices, adherence to certifications and standards, and other financial, operational, and organizational data can be shared. With smart contracts, information sharing can be controlled, scheduled, triggered by events, or delivered on demand and in real-time to meet the manufacturer's or the network's needs. Smart contracts also helps codify business terms and conditions and also embed business logic to automate multi-party processes between participants in the supply chain. The net result is that the manufacturer and all the participants up and down the chain can gain real-time or near-real-time visibility into all the data they need to detect and assess risks early and also have all the rules and mechanisms in place to ensure contract compliance proactively manage risk and resilience across the supply chain.

Figure 3:
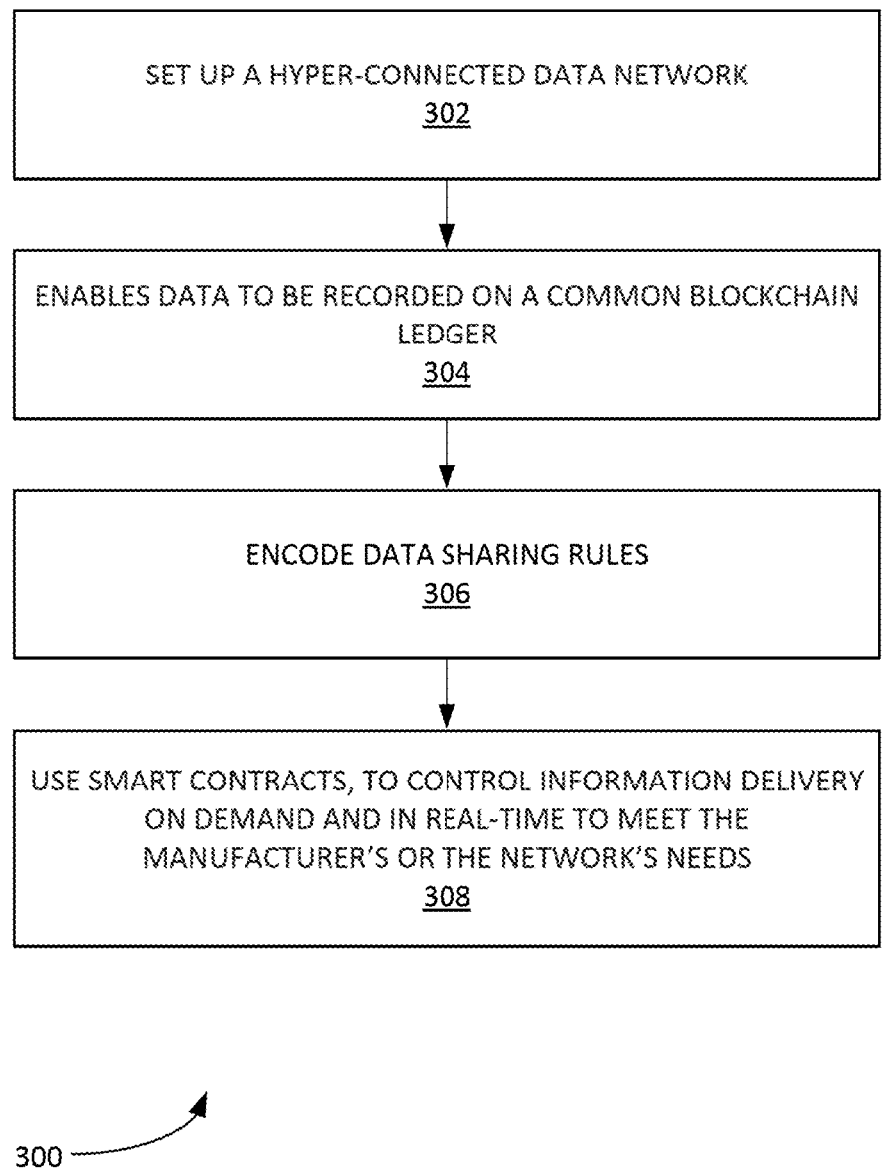
FIG. 3 illustrates an example process for implementing a hyper-connected decentralized data network, according to some embodiments.

FIG. 3 illustrates an example process 300 for implementing a hyper-connected decentralized data network, according to some embodiments. In step 302, with SIPP technology, process 300 can set up a hyper-connected data network that allows different modalities of data sharing between network members in a tier-aware manner. By enabling these information pathways, participants can share data with individuals or multiple participants, as required, across multiple tiers. In step 304, process 300 enables data to be recorded on a common blockchain ledger, which serves as the common decentralized store for verifiable, immutable data. In step 306, data-sharing rules can be encoded to ensure direct and targeted tier-aware communications and reduce information latency through automation.

Figure 4:
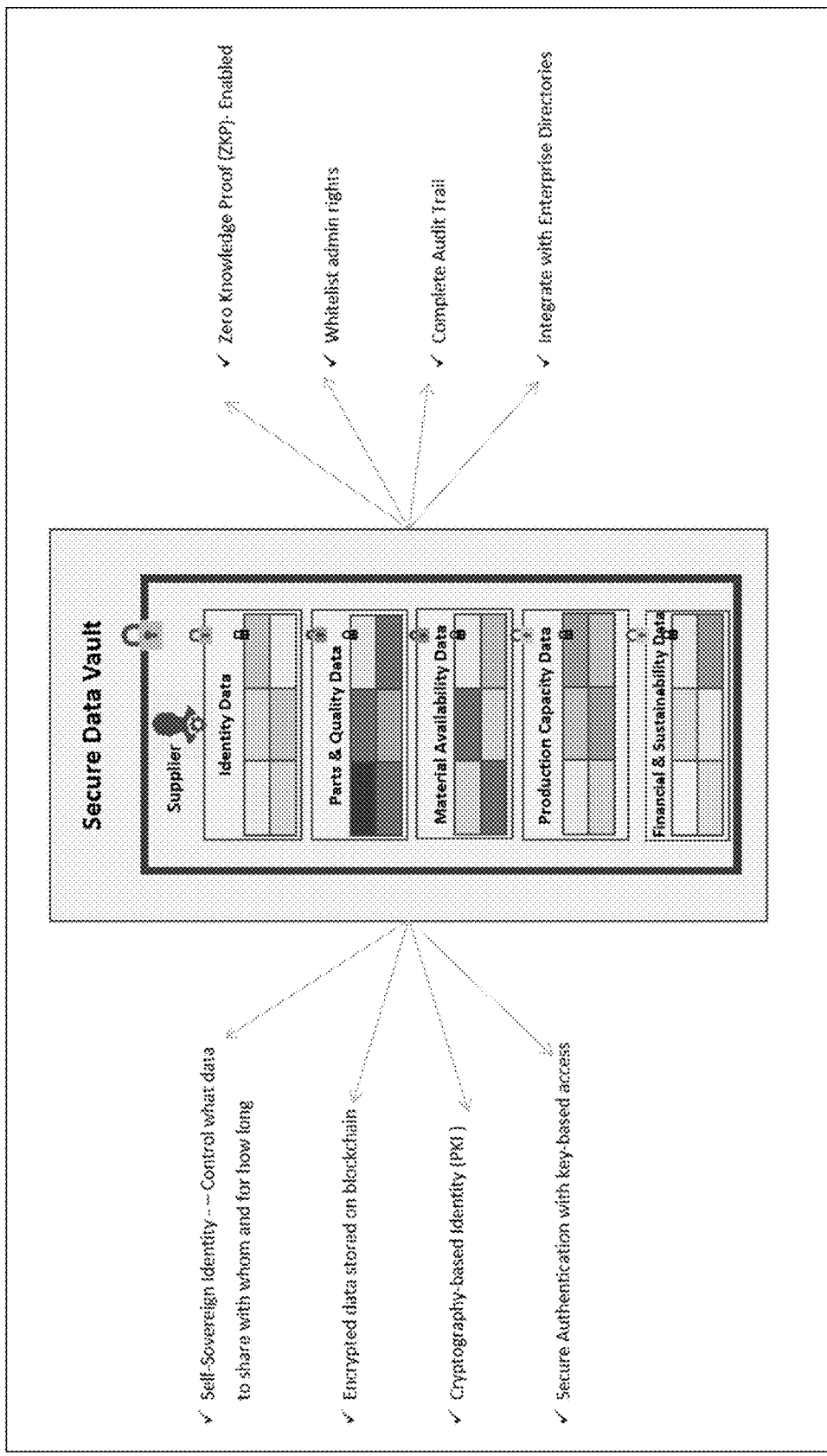
FIG. 4 illustrates an example secure, flexible identity and privacy framework, according to some embodiments.

Returning to process 100, in step 104, process 100 can implement a secure data vault. FIG. 4 illustrates an example secure, flexible identity and privacy framework 400, according to some embodiments.

Figure 5:
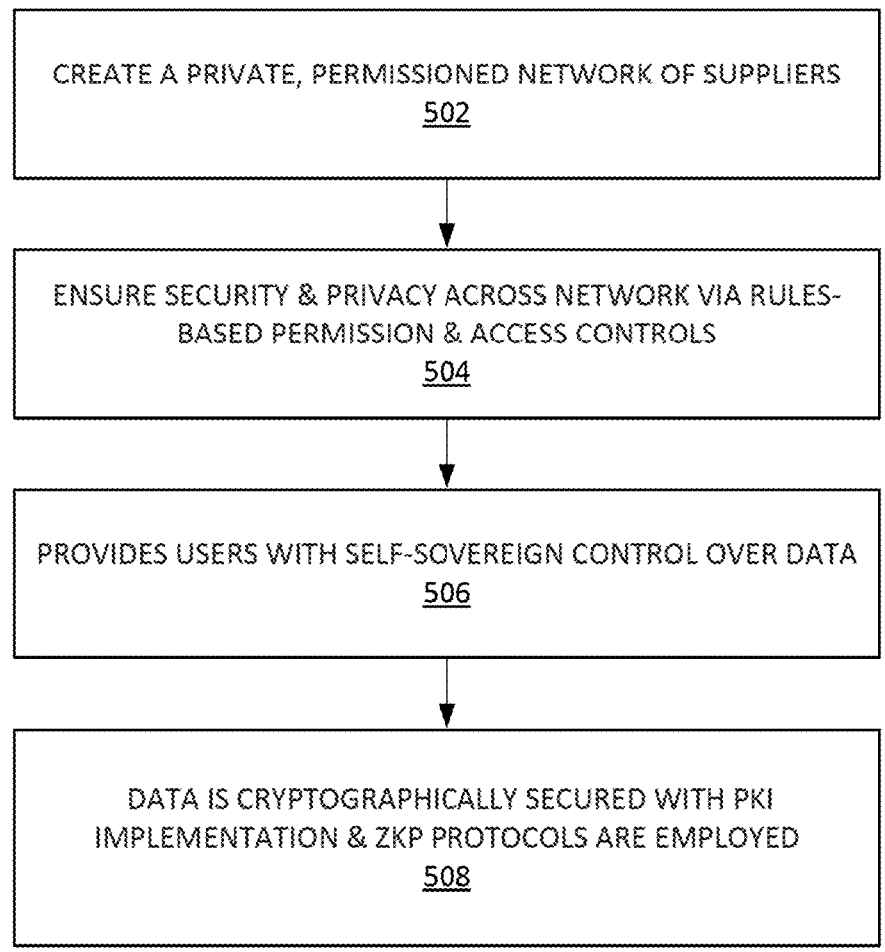
FIG. 5 illustrates an example process for implementing a Secure Data Vault (SDV), according to some embodiments.

The Secure Data Vault (SDV) allows a participant to select and assemble the precise data set they want to share with specific other participants, thus giving them full 'self-sovereign' control over the privacy and security of the data that they share within the supply chain. A Supplier is any participant within the supply chain that offers a good or a service to other participant(s) in the supply chain. Identity data could be any data that helps identify a participant in the supply chain such as Name, location, or any certificate or document that includes any such data. Parts and quality data refers to any data that identifies or describes the part and its quality parameters. Material availability data refers to the quantum of availability (in weight or units) of a part within the supplier's inventory within a specific time period. Production Capacity data is the total capacity of the supplier to produce a certain product or component. Financial data refers to any company financial data of the participant and Sustainability data refers to the data associated with the company's sustainability footprint including carbon emissions, water usage, energy usage, gender diversity, and such environmental, social and governance data FIG. 5 illustrates an example process 500 for implementing a Secure Data Vault (SDV), according to some embodiments. In step 502, process 500 creates a private, permissioned network of suppliers that are registered and approved to join the network, based on verifiable qualification data. Only approved entities can access and participate in the network. To address trust, security, and privacy concerns against sharing data within the network, in step 504, process 500 helps ensure that the security and privacy across the network can be ensured via rules-based permission and access controls that are entity and tier-aware. Further, the SDV can offer direct and granular control for each entity to manage what specific data or data sets they share with whom (e.g. via whitelisting), and for how long, thus giving every network member 'Self-sovereign control' over their data down to a 'field level', which in turn, improves their confidence and comfort in sharing data within the network. Business entities and/or individuals have private data sets that they want full control over. In step 506, the SDV provides them with self-sovereign control over all their data and helps them segment, organize, manage, and share (or not share) data from within and across data sets in a flexible manner. They can combine any data/field with other data/fields and create custom data sets that they can then share. They can also set rules for data-sharing (e.g. and/or automate data sharing based on rules) for example they can share data on a schedule or share data based on specific trigger events.

All data is cryptographically secured with PKI (Public Key Infrastructure) implementation, digitally signed to verify authorship, and ensure, only authorized users with the right keys can receive or access data. In step 508, process 500 Zero Knowledge Proof (ZKP) protocols are employed to verify business facts without requiring participants to share or reveal actual data—leading to a completely new level of data privacy and security. Data within the network is fully encrypted to enhance the privacy and security of data at rest. All data can be further encapsulated within 'SIPP tokens' which are described below.

Figure 6:
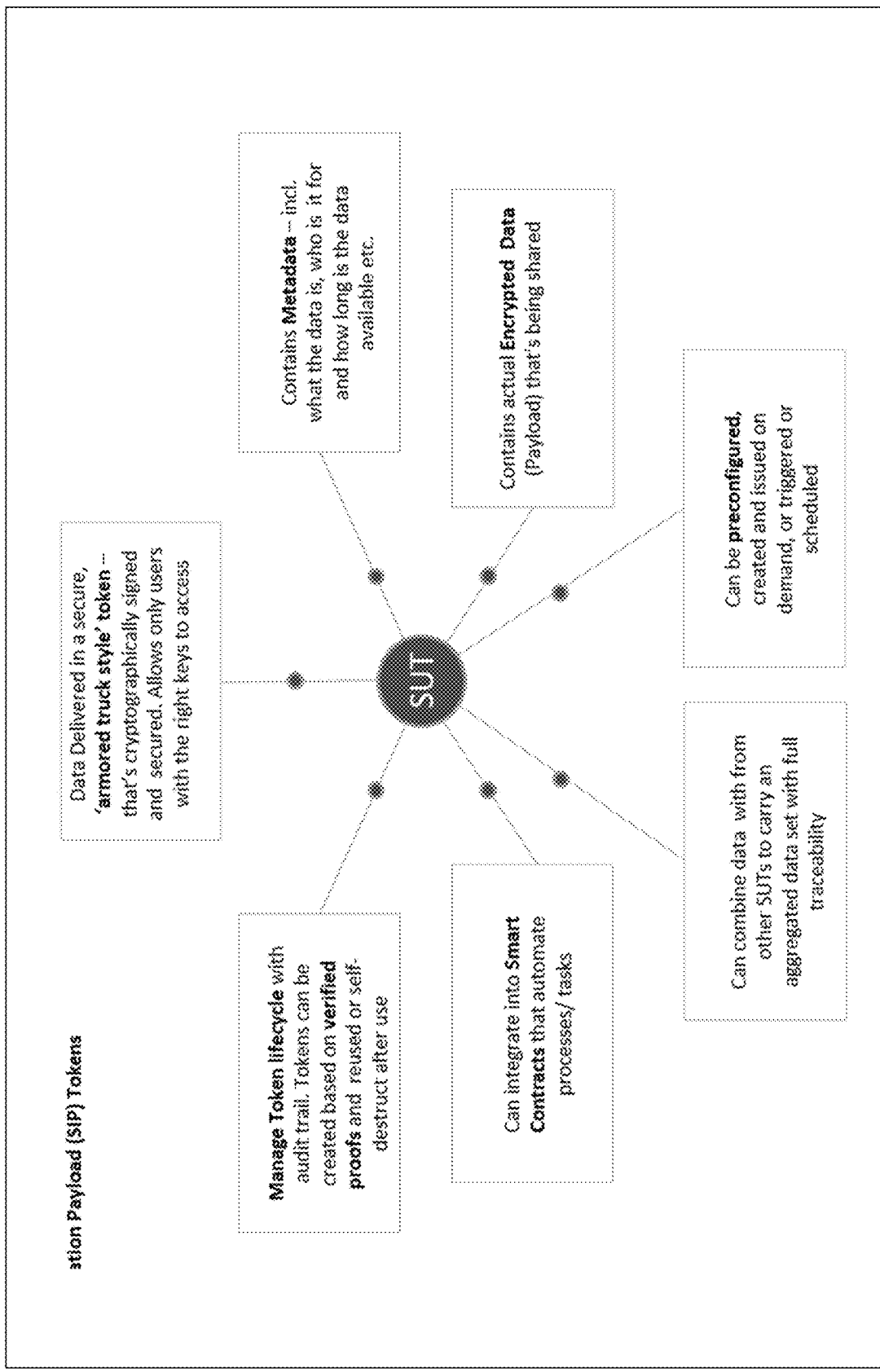
FIG. 6 illustrates an example screenshot with a description of Smart Utility Tokens (SUT), according to some embodiments.

FIG. 6 illustrates an example screenshot 600 with a description of Smart Utility Tokens (SUT), according to some embodiments.

Figure 7:
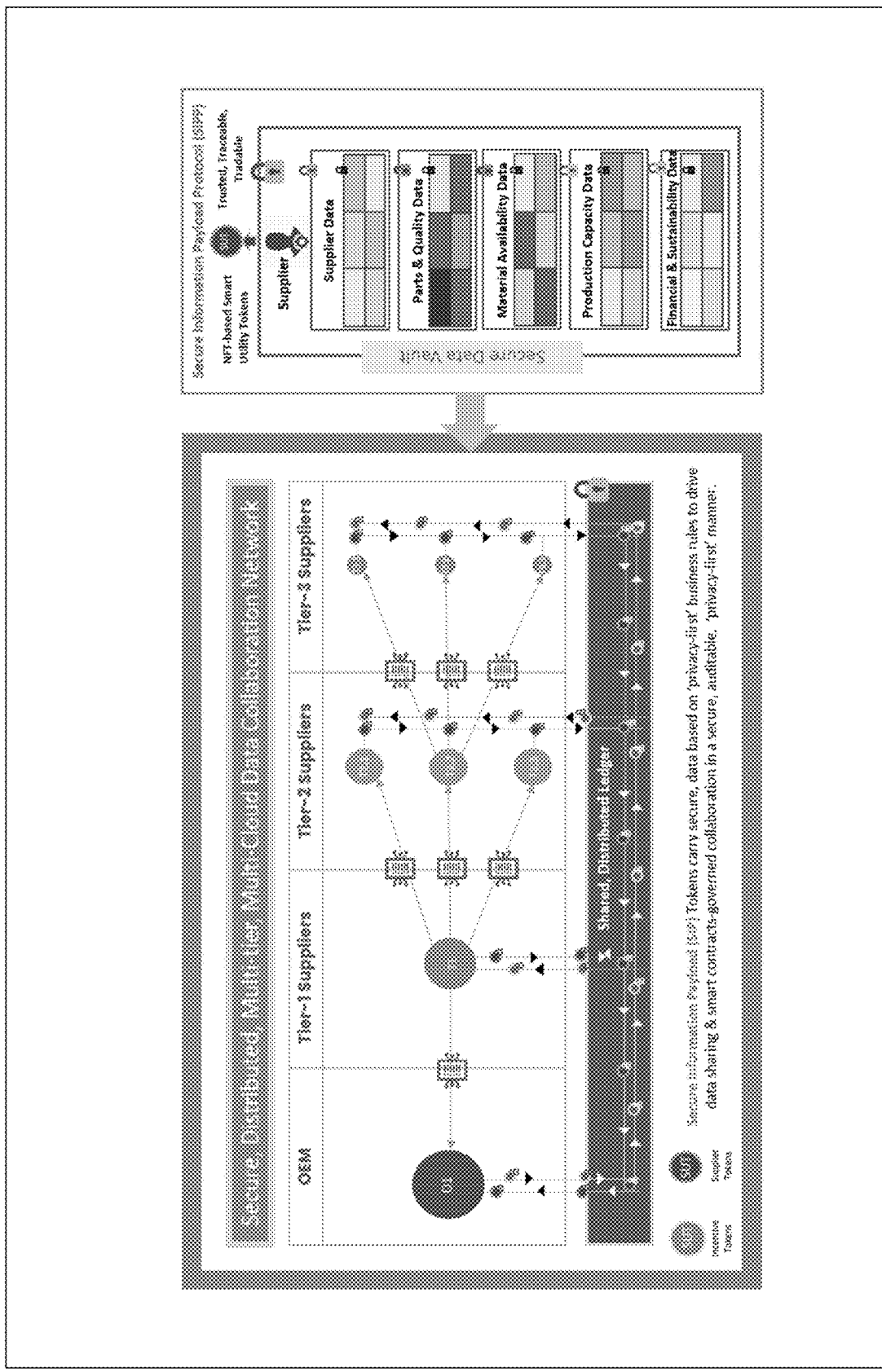
FIG. 7 illustrates an example schematic of a supply chain visibility and information exchange, according to some embodiments.

FIG. 7 illustrates an example schematic 700 of a supply chain visibility and information exchange, according to some embodiments.

Smart Utility Tokens (SUT) are now discussed. As shown in FIGS. 6 and 7, SUT can provide specialized-secure blockchain-generated tokens. SUTs can securely carry information or data sets between network nodes and operate like an 'armored trucks' metaphor that encapsulates and transport specific data sets that are securely packaged, encrypted, and made tamper-resistant and addressed to intended recipients across various tiers of the supply chain network. SUTs can enable a secure exchange of data and value within the business network, based on identity, relationship, and business rules. With greater security and privacy, process 800 can ensure greater willingness amongst suppliers to share information and ensure data integrity and tamper-resistance thus giving more reliable data for risk and resiliency management.

Example properties of Smart Utility Tokens (SUTs) are now discussed. Besides the properties listed in the illustration above, the tokens are generated and controlled by smart contracts embedded within each token that codifies and implements all the token logic and behavior. Conversely, each token may also be part of a smart contract that implements business terms and conditions between network participants. For example, in a Vendor Managed Inventory (VMI) scenario, the VMI smart contract may invoke a specific SUT as a part of its data-sharing logic. The token can also have a configuration file that defines the properties of the token. Changes to the configuration file can change the properties of the behavior of the token.

Broadly, the SUT has 3 key properties:

Trust—with cryptographically secured data, verifiable source/identity, ownership, data, proofs, date/time, location etc. The SUT will also have a veracity or trust score, which indicates its value and will influence its Tradability.

Traceability—The SUT provides all traceability of the data it encapsulates, which means every data (also if the SUT combines data from other SUTs) will show full traceability or its provenance all the way to the source(s) where each data originated.

Tradability—These NFTs can be traded in exchange for value for fungible 'Currency' tokens which can be used for Incentives or for supporting various supply chain financing models.

Figure 8:
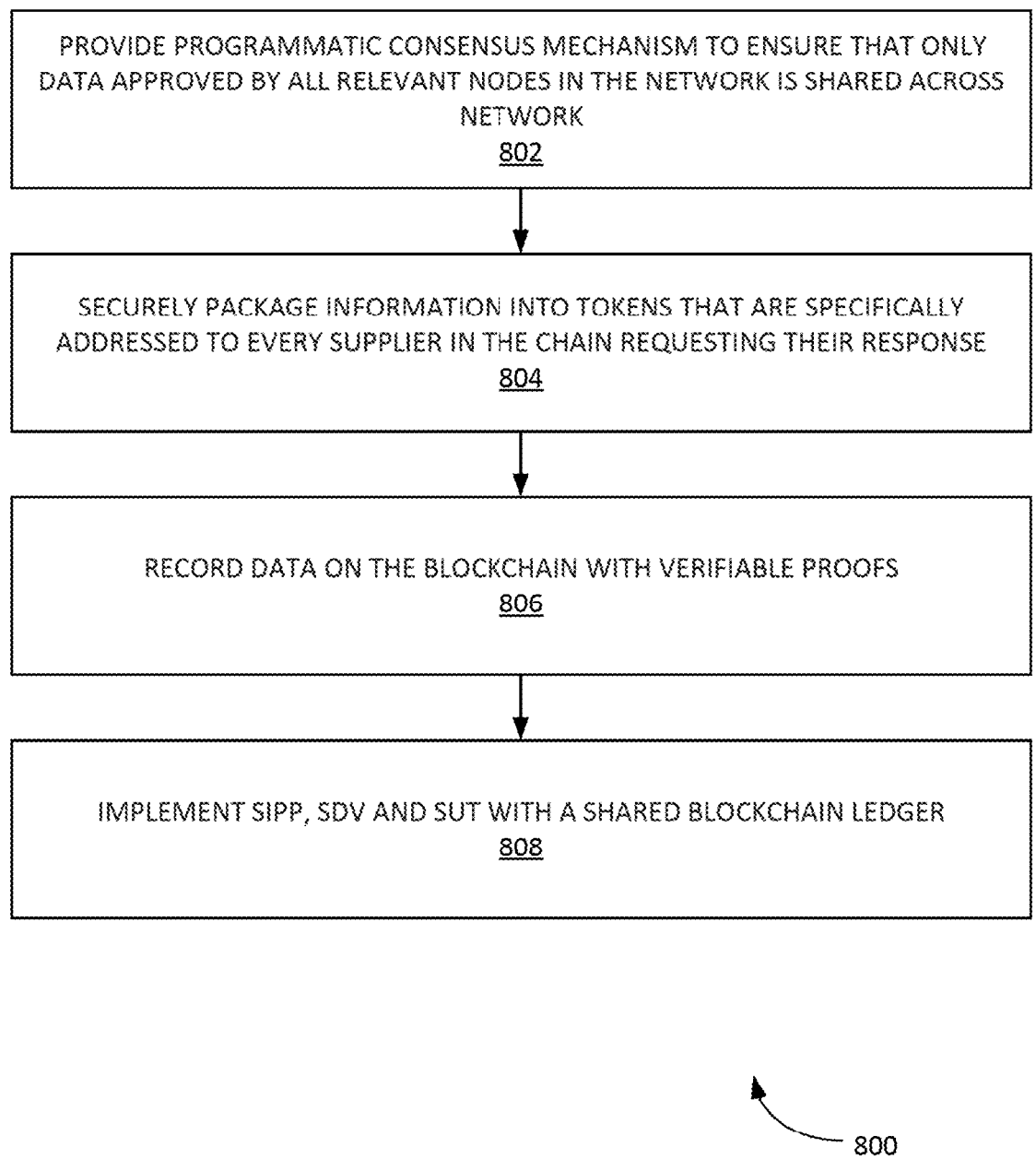
FIG. 8 illustrates an example process for using SIPP technology and SDV in a SUT context, according to some embodiments.

In step 106, process 100 can use SIPP technology and SDV in a SUT context. FIG. 8 illustrates an example process 800 for using SIPP technology and SDV in a SUT context, according to some embodiments. Process 800 can be implemented in a multi-tier supply chain visibility scenario. With SIPP technology and SDV, all participants across the supply chain including deep-tier suppliers can confidently share data required upstream or downstream, in a trusted manner via a decentralized, immutable, permissioned ledger. In step 802, process 800 uses a programmatic consensus mechanism to ensure that only data approved by all relevant nodes in the network is shared across the network. If the network wants to keep the identity of suppliers in any tier private, they can agree and decide to do so. So, this way everyone feels secure and confident in allowing different modalities of data sharing and enabling all required demand and supply signals to be transmitted freely and instantly without latency or loss of information. For example, if the manufacturer has a new demand for 100,000 gasoline-powered 6-cylinder cars and wants to know if the supply chain can help fulfill this demand, it can then immediately transmit that demand signal across the entire supply chain without having to send this first to the Tier 1 supplier and then waiting for it to go through various hops and delays before it gets back the response; with a high possibility of information lost in translation as well. In step 804, with SIPP technology, process 800 uses this information is securely packaged into tokens that are specifically addressed to every supplier in the chain requesting their response The demand signal gets personalized and translated for each supplier—for example, the spark plug supplier in say tier 3, can obtain an automatically translated demand for 600,000 spark plugs and it can then sent its response back across the network through all approved upstream suppliers to the manufacturer instantly. That way all demand and supply signals can originate at any tier and can be transmitted asynchronously without waiting on any other participant thus reducing latency greatly.

In step 806, this data is recorded on the blockchain, with verifiable proofs and ensuring data integrity and trust. Further, this can ensure that any participant doesn't have the means to manipulate or misrepresent data for their benefit. This approach creates new means of trusted, trackable, and traceable data sharing in a secure and auditable manner. Process 800 can then consistently ensure that the right data is made available to the right entity or user, with the right permissions, at the right time for timely decisions and transactions thus ensuring overall integrity, efficiency, and effectiveness of the network. New models of information sharing can also be enabled, where a value can be attached to specific data or data sets, which in turn, can help create, for example, an incentive system to promote data sharing.

In step 808, process 800 implements SIPP, SDV, and SUT with a shared blockchain ledger, bringing a new level of agility, and transparency across complex multi-tier supply chains that struggle with opacity, efficiency, and trust issues. This, in turn, enables the instant and frictionless transmission of various demand and supply signals with greatly minimized latency that are required to make timely, intelligent decisions to manage risks better and improve overall supply chain resiliency.

Processes 100 and 800 can be used to improve network governance. Processes 100 and 800 can provide and manage capabilities to automate, monitor, and/or manage key supplier agreements and contracts. For businesses dealing with sensitive or confidential information, meanwhile, a permissioned blockchain can limit data sharing to a need-to-know basis, with strict authentication requirements ensuring governance on how information is shared across the network. Self-executing, programmatic smart contracts ensure secure reliable, consistent execution of agreements and business rules to improve operational efficiency and eliminate human errors and other exceptions. Processes 100 and 800 can use the blockchain, with its immutable property, which provides a tamper-proof audit trail for all the recorded data for compliance and stakeholder reporting.

Processes 100 and 800 can enable new business models and build value-webs. Processes 100 and 800 can use the blockchain to permit new ways of engaging with suppliers. Processes 100 and 800 can use blockchain's tokenization capabilities to enable new information, business, and financing models by representing tokens as a store of value or a medium of value exchange. Tokens can be used to represent and transact underlying information, contractual commitments, and actual business assets.

Returning to process 100, in step 108, process 100 can implement tokens (NFTs) (e.g. smart utility tokens (SUTs)) as business commitments or options. Smart Utility Tokens (SUTs) can be for sharing data and to execute contracts related to business commitments and options SUTs can add incentivization and/or sustainability financing models.

Figure 9:
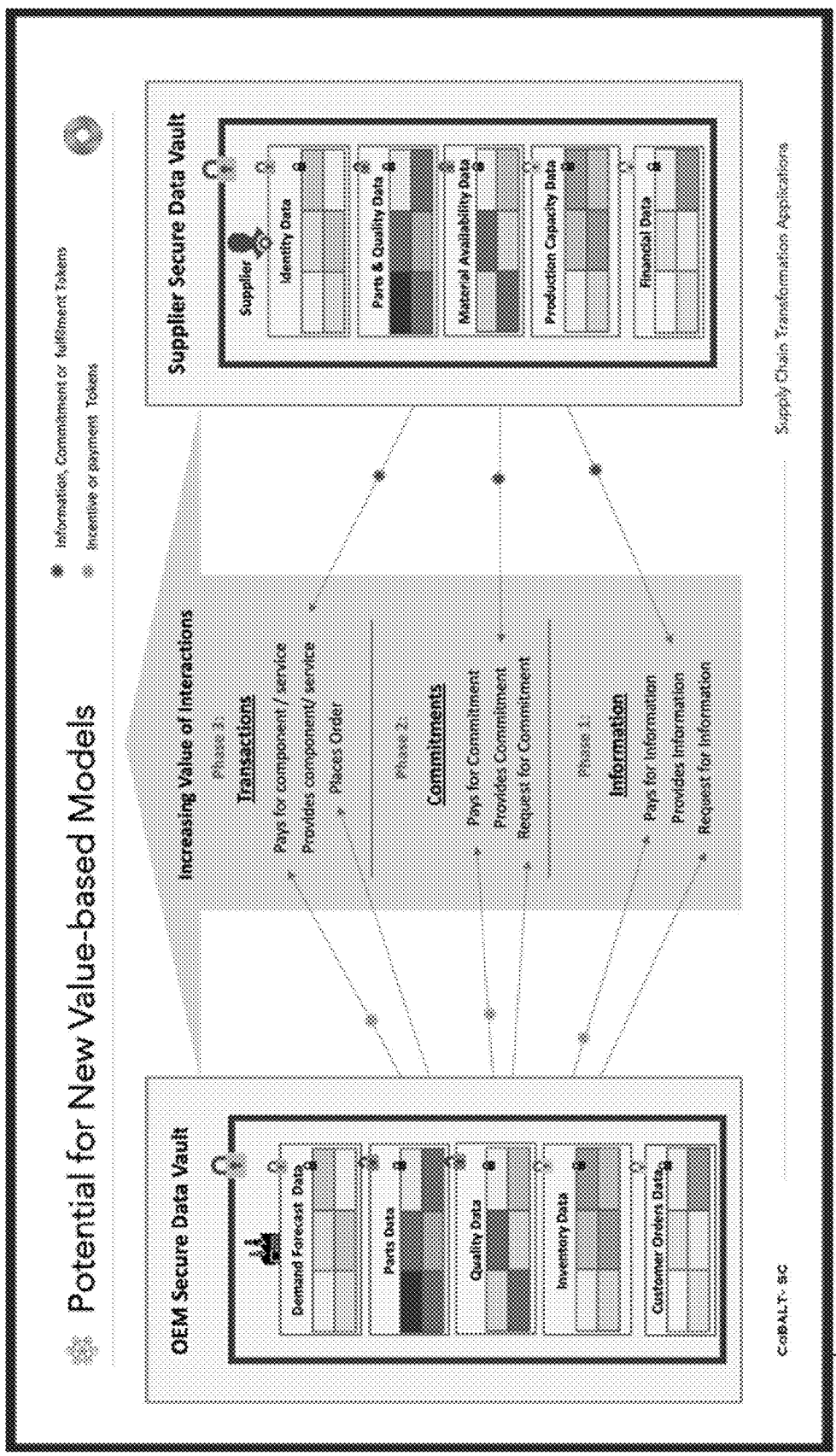
FIG. 9 illustrates an example screenshot showing example value-based models, according to some embodiments.
Figure 10:
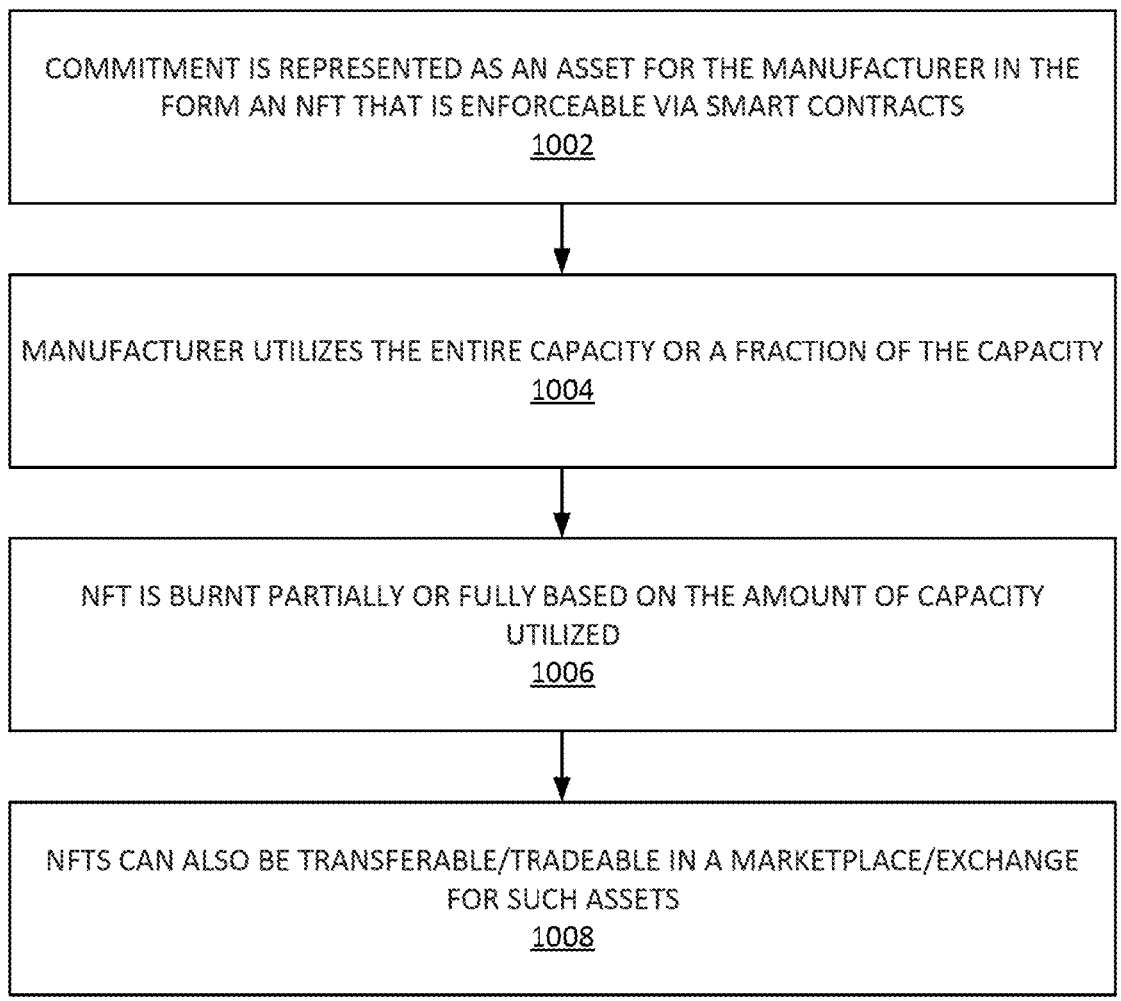
FIG. 10 illustrates an example process for implementing Tokens (e.g. NFTs) as Business Commitments or Options, according to some embodiments.

FIG. 9 illustrates an example screenshot 900 showing, value-based models, according to some embodiments. FIG. 10 illustrates an example process 1000 for implementing Tokens (e.g. NFTs) as Business Commitments or Options, according to some embodiments. It is noted that tokens can be contractual commitments means that a supplier gives the manufacturer (e.g. factory) capacity or material commitment to help fulfill an order or annual demand. In step 1002, this commitment can be represented as an asset for the manufacturer in the form of an NFT that could be enforceable via smart contracts. This NFT can be seen as an Option that the Manufacturer now has the right to exercise and utilize the committed capacity. In step 1004, the manufacturer can choose to utilize the entire capacity or a fraction of the capacity. In step 1006, the NFT is burnt partially or fully based on the amount of capacity utilized. Unutilized capacity continues to represent remaining commitment. In step 1008, these NFTs can also be transferable/tradeable in a marketplace/exchange for such assets. Also, the commitment/option smart contracts can include rewards and penalties that can be applied to the vendors/suppliers based on contractual fulfillment.

Figure 11:
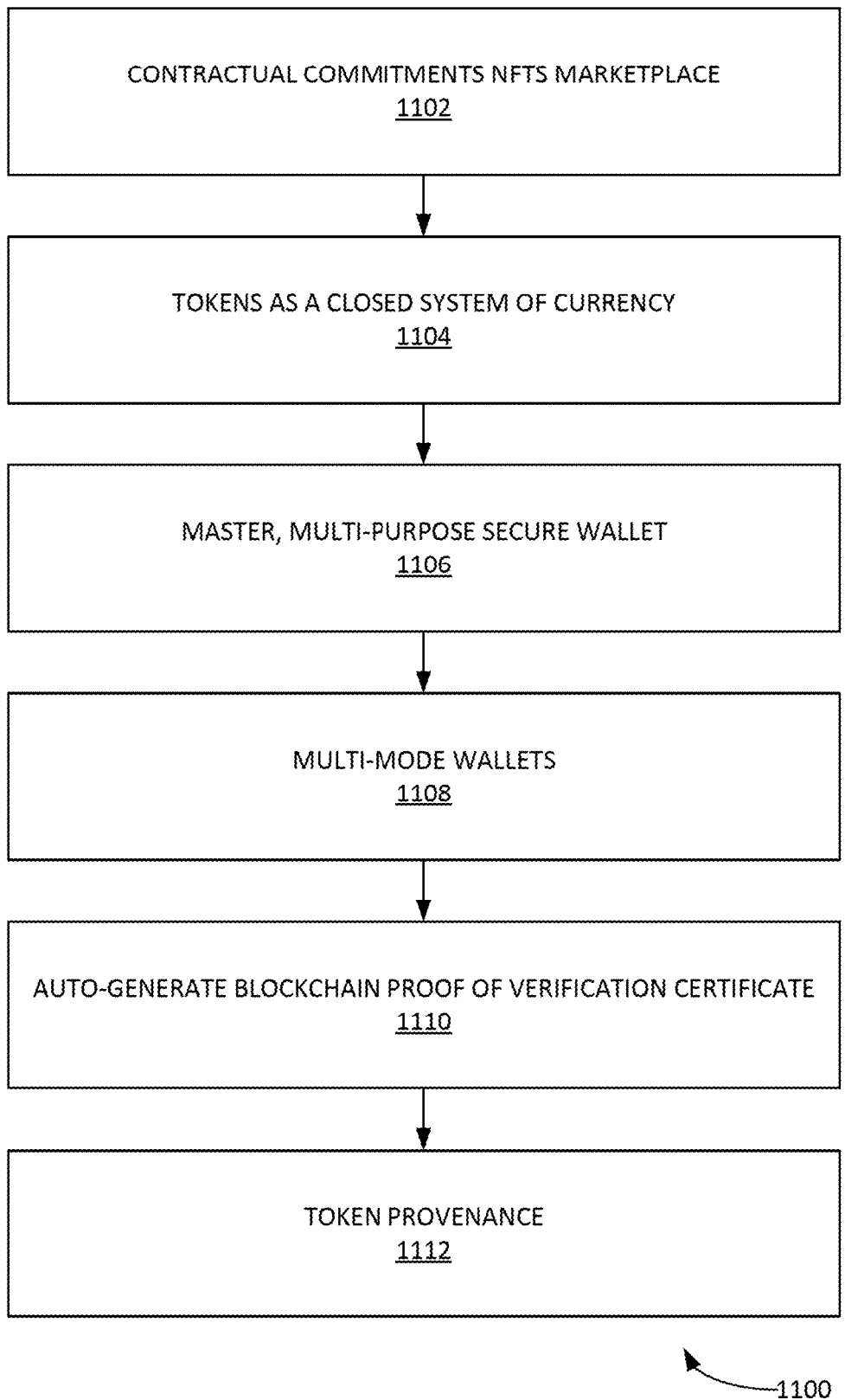
FIG. 11 illustrates an example process for implementing NFTs, according to some embodiments.

FIG. 11 illustrates an example process 1100 for implementing NFTs, according to some embodiments. In step 1102, the process can implement contractual commitments NFTs marketplace. This can be a marketplace where vendors sell capacity and materials as commitments/options. Buyers can buy these commitments and use them or trade/exchange them with others in the marketplace. All NFTs and their behavior and utilization can be governed by smart contracts.

In step 1104, process 1100 can implement tokens as a closed system of currency. Tokens can also be used as an internal system of currency for facilitating transactions within the network, enabling instant, direct settlements at a fraction of current transaction costs charged by financing intermediaries, helping improve liquidity and avoid business disruptions due to working capital constraints. A phased approach toward implementing and evolving the token system to represent information tokens, commitment tokens, and currency tokens can be taken to meet the evolving needs of the supply chain.

In step 1106, process 1100 can provide and manage a master, multi-purpose secure wallet. The master wallet (e.g. a digital wallet) can be a secure digital, multi-purpose digital wallet that can be used by individuals to store all information they need to interact with and pay for various online and offline services. The master wallet can have the ability to store and retrieve keys, digital assets, currency, loyalty rewards tokens, personal data, financial data, medical and social media data, or even 3' party data. The master wallet can also include all the transactions history, account balances, and history of what data was shared with whom and when. The master wallet can have the Secure Data Vault Technology embedded to enable secure, self-sovereign data sharing—which means only the wallet owner will have full, exclusive access to all this data and how they want to share data with others. The various capabilities of the Secure Data Vault (SDV) can be utilized within the master wallet.

In step 1106, process 1100 can implement and manage multi-mode wallets (e.g. digital wallets). The multi-mode wallets can be operative in an offline mode as well. The multi-mode wallets can work both online and offline. Users can transact with each other using these wallets even without an internet connection.

In step 1108, process 1100 can auto-generate blockchain proof of verification certificate. Process 1100 can generate shareable certificates of any data that is recorded and verified on the blockchain. These certificates are generated in pdf format and have the associated cryptographically validated information with (e.g. multi-media) proofs included/embedded in the certificate document. Accordingly, process 1100 can enable sharing of blockchain proof(s) enriched with the validated information such that a business, consumer, regulatory, or auditing entity will be able to process better the data rather than them having to interpret all the cryptic information in the blockchain.

In step 1110, process 1100 can implement a token inside a token. Process 1100 can create multi-level token structures. In one example, an NFT can contain Fungible Tokens (FT). In one example, a gift card can be an NFT (e.g. each gift card is unique, authentic, and has an owner) and each gift card can derive value from fungible tokens. In one example, a card-carrying $100 value may derive its value from 100 FTs of $1 each or a combination of denominations. In this example, the NFT can serve as a container for holding the FTs and derives its value from the total value of FTs it contains at any point in time.

In step 1112, process 1100 can implement automated Wallet-to-Wallet Communication and related transactions. Process 1100 can communicate and transact with another wallet based on a smart contract that governs transactions between two or more individuals based on pre-approved rules and signed off by all parties involved.

In step 1114, process 1100 can determine Token Provenance. An asset can be represented as a token. A token itself can be an asset if it has intrinsic value. Each token carries tracker information of its lineage/provenance providing instant access to the information related to the journey/history of the token (e.g. and the underlying asset it represents).

Blockchain for IoT Life Cycles

Figure 12:
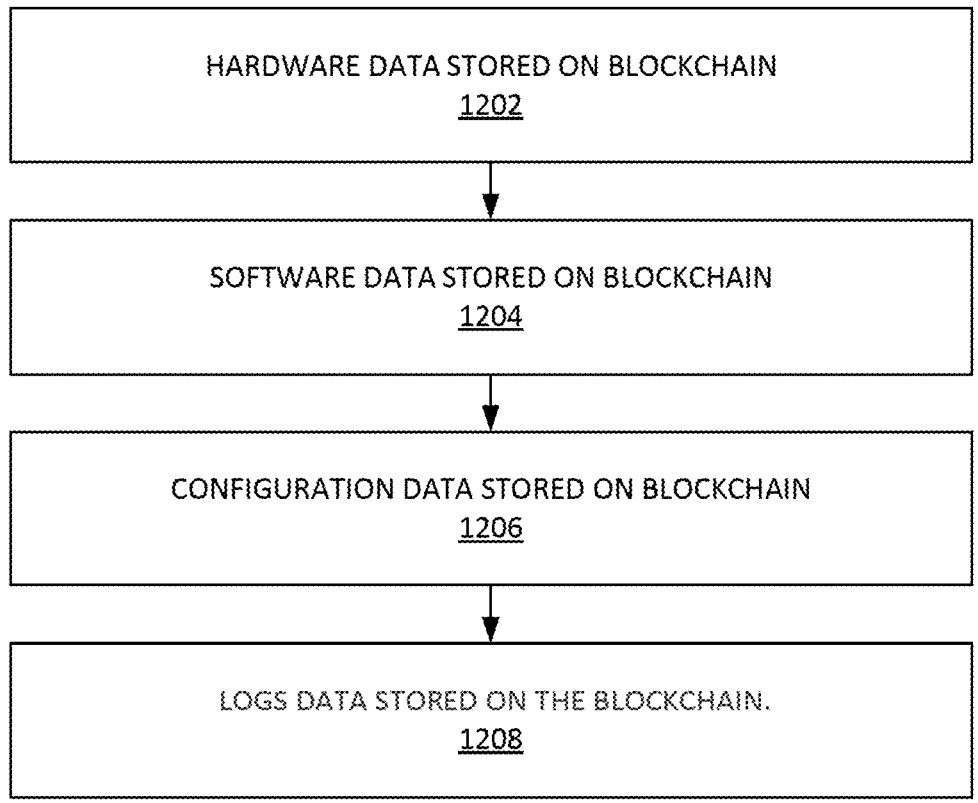
FIG. 12 illustrates an example process for implementing blockchain for IoT lifecycles, according to some embodiments.

FIG. 12 illustrates an example process 1200 for implementing blockchain for IoT lifecycles, according to some embodiments. Blockchain is a trustless and fully decentralized peer-to-peer immutable data storage. IoT devices require it to store their data during their lifetime. In step 1202, hardware data can be stored on the blockchain. It is noted that an IoT device consists of many components. Therefore, they need to be documented and tracked. The component data includes manufacturer, id, serial number, built date, shipping date, locations, certificates, tests, hardware configurations, drawings, specifications, contact info, maintenance date, and schedules, update data and schedule, end-of-life schedule, etc. The information is accessible to many parties for transfer ownership, operation, maintenance, update, recall, and end-of-life.

In step 1204, software data can be stored on the blockchain. This can be similar to hardware components, software OS, libraries, APIs, data formats, protocols, computer languages, versioning, source control, tests, certificates, vendors, etc. The software is accessible to many parties for transfer ownership, operation, maintenance, update, recall, and end-of-life.

In step 1206, configurations can be stored on the blockchain. Software configurations make each device performs specific tasks differently from its peers. A device's configuration may consist of the manufacturer's configuration, the company's configuration, the group's configuration, and its configuration. The configurations are accessible to many parties for transfer ownership, operation, maintenance, update, recall, and end-of-life.

In step 1208, logs can be stored on the blockchain. Processed or unprocessed logs may be stored on the blockchain, depending on requirements, performance, storage, network, accesses, transactions, etc. The logs are accessible to many parties for transfer ownership, operation, maintenance, update, recall, and end-of-life.

Process 1200 can include software that uses AI algorithms to access data in the blockchain to automate and optimize the transfer ownership, operation, maintenance, update, recall, and end-of-life for IoT devices. Process 1200 can include software that uses AI algorithms to enable machine-to-machine communication where devices configure themselves based on the data in the blockchain. The stakeholders (e.g. manufacturers, service providers, customers, users, etc.) can access the devices' data to update their software and configurations. The stakeholders can access the configurations and logs of the device for analysis to enhance the next-generation hardware and software. The stakeholders can access the configurations and logs of the device to recall the device for theft, loss, dispute, non-compliance, illegal use, etc. The stakeholders can access the configurations and logs of the device to provide temporary ownership of the device to different customers for some time. The stakeholders can access the configurations and logs of the device for accounting and auditing purposes.

Creating Trust—Avoiding Garbage in Garbage Out

Blockchain is a permanent record of information that cannot be modified or tampered with, which makes the problem of "Garbage In Garbage Out" even worse as it becomes "Garbage Forever". Since Blockchains are now being used to store not only Fungible Tokens (FTs) such as money, but also non-fungible tokens (NFTs) representing physical assets including art, music, video clips, and sports memorabilia. It can also be used to represent an enterprise-to-enterprise transfer of ownership associated with physical assets such as containers, truckloads, and shipping loads as well as Carbon credits, energy generated, carbon offsets as well as legally acceptable agreements like transportation contracts, bills of lading, invoices, purchase orders, contracts, and other such items that require collaboration across multiple parties. There are agency problems in virtual worlds/metaverses etc., where the large player who is organizing the ecosystem can control the quantity and therefore the price of the asset.

Certification Agencies and Validation Processes

It is noted that there are various certification and accreditation organizations such as, inter alia: USDA, Organic certifications, CE, FCC, FDA, ISO, Control Union, Forest Stewardship Council, and others including Audit firms such as Deloitte, Accenture, Ernst & Young, Price Waterhouse Coopers, etc. These entities can have core processes that set standards, have participants make claims, and independent third-party conduct inspections, verify the claims, and certify that indeed the standards have been followed or the claim is valid.

Given the immutability and shared ledger property of blockchain, it is important to replicate the workflows associated with the certification processes to eliminate the potential for fraud and bad data. The combination of track and trace technology with the certification process supplemented by IoT, camera, and sensor data, verified by Artificial Intelligence and Machine Learning algorithms trained to look for fraud and approved by humans who are trained, and putting their reputation on the line while doing the certification and sharing the data and methods in an open source manner for independent verification is a unique approach that significantly reduces the aperture for fraud or eliminates it.

Machine Learning to Generate and Optimize Models for Incremental Route Optimization Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random Forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised, or unsupervised.

Machine learning can be used to study and construct algorithms that can learn from and make predictions on data. These algorithms can work by making data-driven predictions or decisions, by building a mathematical model from input data. The data used to build the final model usually comes from multiple datasets. In particular, three data sets are commonly used in different stages of the creation of the model. The model is initially fit on a training dataset, which is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consists of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (e.g. in cross-validation), the test dataset is also called a holdout dataset.

Universal Wallets and Biometric Identity

Figure 13:
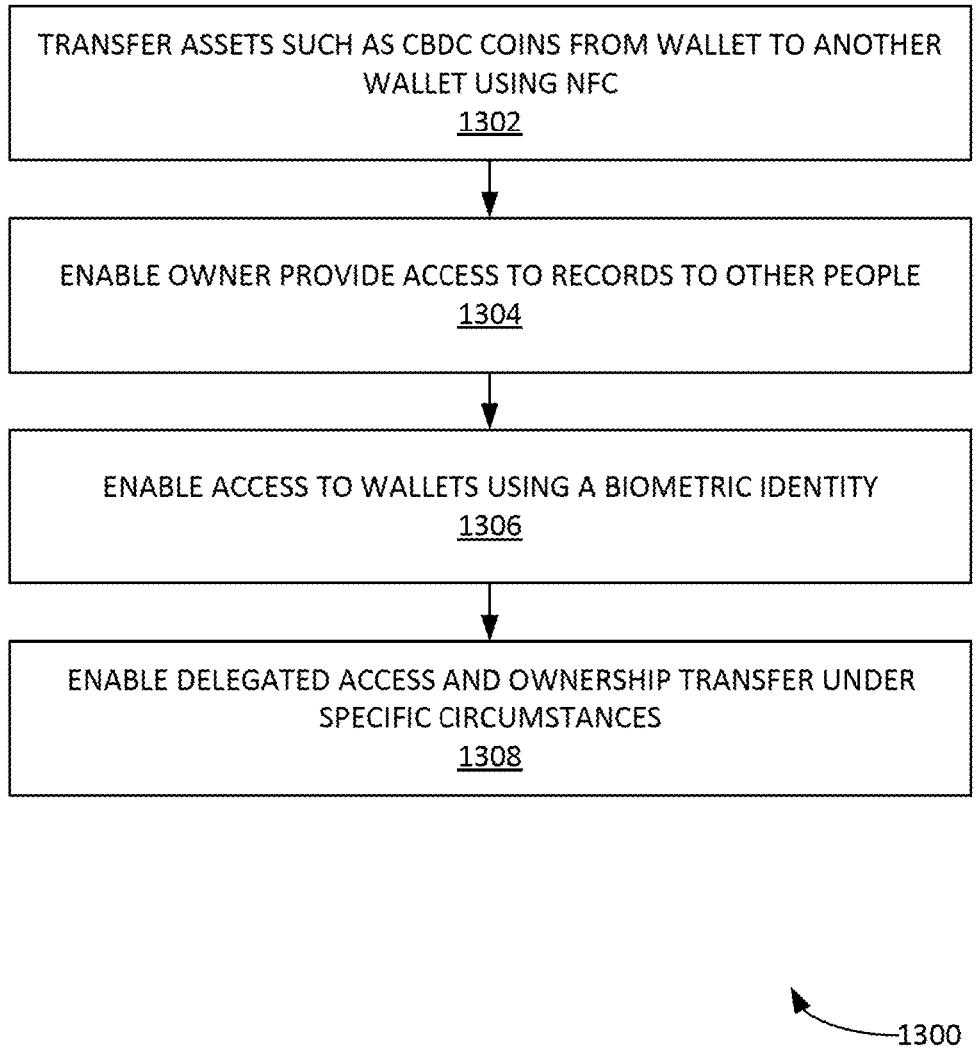
FIG. 13 illustrates an example process for implementing universal wallets and biometric identity, according to some embodiments.

FIG. 13 illustrates an example process 1300 for implementing universal wallets and biometric identity, according to some embodiments. Process 1300 can provide a universal wallet (e.g. a digital wallet) that can operate in offline and online modes, where it can transact without being connected to the internet. The wallet can hold anything that can be digitalized. This can include, inter alia: government-backed money Central Bank Digital Currency (CBDC), Crypto Coins (Bitcoin, Ethereum, etc.) alternative Crypto coins, FTs, NFTs, health records, medical records, lab records, and other personal profiles within this Universal Wallet. The innovations in the Universal Wallet can be used to transfer information in and out of the wallet without depending on Exchanges or Networks like Visa or Mastercard. In step 1302, process 1300 can transfer assets such as CBDC coins from one wallet to another wallet using NFC or equivalent. In step 1304, process 1300 can enable the owner to provide access to the records to other people who need temporary viewing access for certain information to be used for specific purposes such as diagnostics or medical research. The owner can be paid or incentivized using tokens to share information for a larger cause.

In step 1306, process 1300 can enable access to the wallet using biometric identities such as facial recognition, that verifies the identity against a trusted, validated identity source such as driver's license or passport records, or corporate databases. In step 1308, process 1300 can enable delegated access and ownership transfer under specific circumstances such as a verified death record, and validated against information stored in a will or trust. In the case of wallet custody on behalf of a business, role-based access and delegated access provided through the master identity system allows the access to be revoked, transferred to a new employee upon termination of the prior employee, change of role, etc.

Tokenization, Asset Monetization, Trade Finance

Methods can be utilized to tie together the physical flow of goods and services with the contractual ownership documents that are shared, with the messaging/information flows that need to be shared, and last, but not least the financial flows associated with payments. These methods can utilize mini networks of networks connected using the N Tier mechanisms described earlier. This can include the process of taking physical objects and creating a trusted unique digital representation is a key requirement for ensuring that can monetize digital assets in different ways beyond the original intent of the manufacturer. These methods can use delivery, product returns, recalls, circular manufacturing, ESG, proper disposal, carbon offsets, etc.

The network of secure digital twins enabled by these methods enables a whole new set of monetization possibilities such as the ability to provide new capabilities such as invoice factoring and bill payments based on a blockchain-based proof of pickup and proof of delivery with pictures that show the condition of the product, as well as, sensor data such as temperature sensors and humidity sensors provide the information needed for decision making, some of which can be converted to monetary equivalents with payments.

Data Veracity Score

It is noted that in enterprises every data needs to be trusted. This can include data that originates from outside the organization say from suppliers, partners, etc. However, not all data has the same level of verifiable proofs associated with it and hence not all data is equally trustworthy or truthful (e.g. some data may have been manually entered data, some may have a paper trail to back it up, some may have data extracted from an application via APIs and some may have data coming in from a machine or a sensor, etc.). Each of these examples presents increasing levels of verifiability and veracity. A data veracity score algorithm is provided. The data veracity score algorithm can assess the proofs associated with each data on the blockchain and generates a veracity score for each data. On top of this, the data veracity score algorithm also prints the veracity score on the Proof of Verification (PoV) certification that the data veracity score algorithm generates for any data (PoV is already covered in the application).

Example Computer Architecture and Systems

Figure 14:
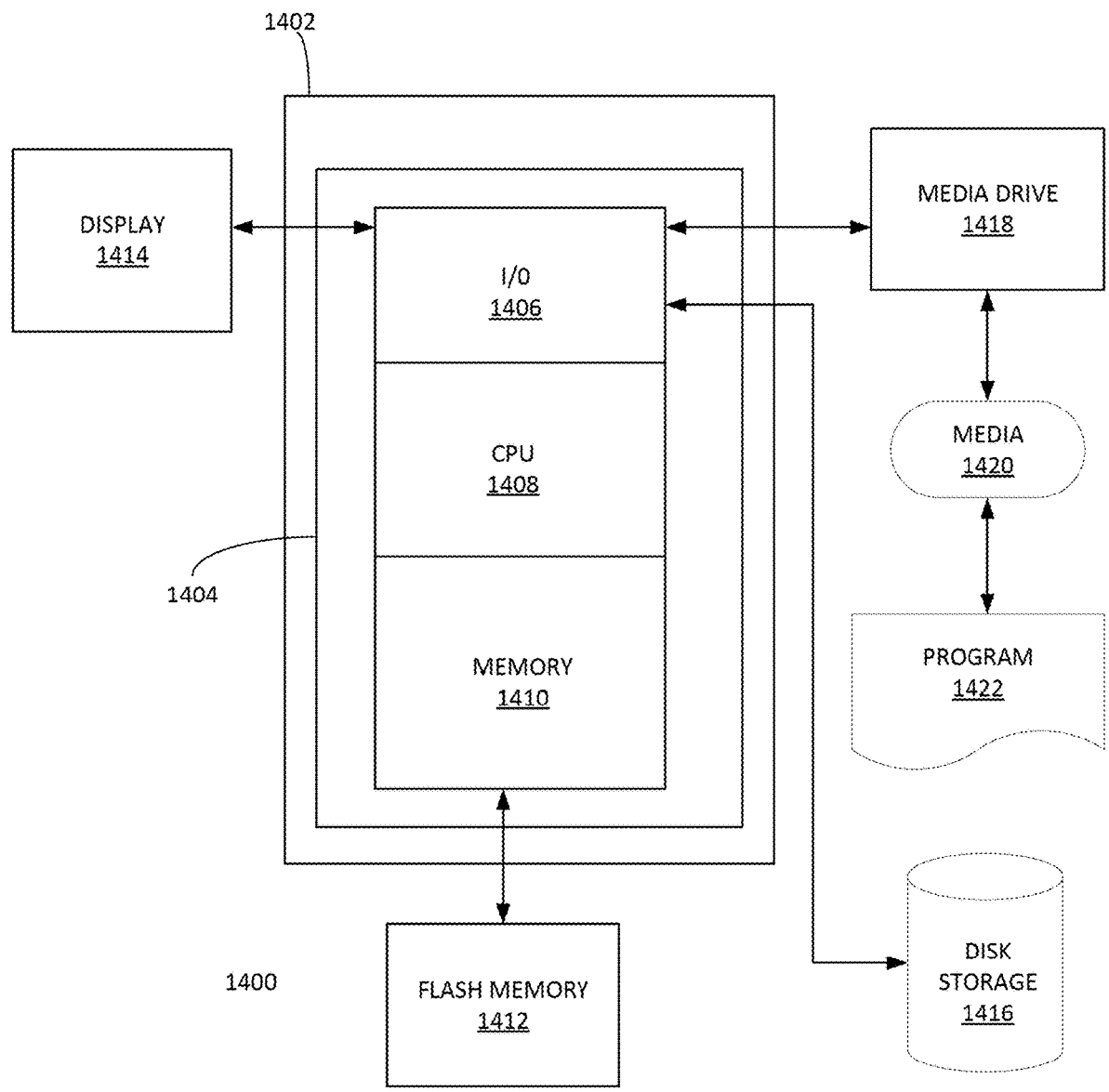
FIG. 14 is a block diagram of a sample computing environment that can be utilized to implement various embodiments.

FIG. 14 depicts an exemplary computing system 1400 that can be configured to perform any one of the processes provided herein. In this context, computing system 1400 may include, for example, a processor, memory, storage, and I/O devices (e.g., monitor, keyboard, disk drive, Internet connection, etc.). However, computing system 1400 may include circuitry or other specialized hardware for carrying out some or all aspects of the processes. In some operational settings, computing system 1400 may be configured as a system that includes one or more units, each of which is configured to carry out some aspects of the processes either in software, hardware or some combination thereof.

FIG. 14 depicts computing system 1400 with several components that may be used to perform any of the processes described herein. The main system 1402 includes a motherboard 1404 having an I/O section 1406, one or more central processing units (CPU) 1408, and a memory section 1410, which may have a flash memory card 1412 related to it. The I/O section 1406 can be connected to a display 1414, a keyboard and/or other user input (not shown), a disk storage unit 1416, and a media drive unit 1418. The media drive unit 1418 can read/write a computer-readable medium 1420, which can contain programs 1422 and/or data. Computing system 1400 can include a web browser. Moreover, it is noted that computing system 1400 can be configured to include additional systems to fulfill various functionalities. Computing system 1400 can communicate with other computing devices based on various computer communication protocols such as NFC, Wi-Fi, Bluetooth® (and/or other standards for exchanging data over short distances including those using short-wavelength radio transmissions), USB, Ethernet, cellular, ultrasonic local area communication protocol, etc.

CONCLUSION

Although the present embodiments have been described with reference to specific example embodiments, various modifications, and changes can be made to these embodiments without departing from the broader spirit and scope of the various embodiments. For example, the various devices, modules, etc. described herein can be enabled and operated using hardware circuitry, firmware, software, or any combination of hardware, firmware, and software (e.g., embodied in a machine-readable medium).

In addition, it can be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A computerized method for a blockchain-enabled Secure Information Payload Packet (SIPP) architecture and protocol for real-time multi-tier data sharing within multi-party systems such as a plurality of supply chains, according to some embodiments comprising:
   providing an N-tier network implemented with the blockchain-enabled secure information payload packet SIPP technology, wherein the N-tier network comprises a decentralized data network and enables a plurality of different modalities of data sharing between network members in a tier-aware manner, and wherein the N-tier network records data on a common blockchain ledger;
   providing a Secure Data Vault (SDV); and
   implementing the blockchain-enabled secure information payload packet SIPP technology and the SDV in a Smart Utility Tokens (SUT) context.

2. The computerized method of claim 1, wherein the N-tier network enables a plurality of information pathways of the data sharing between network members.

3. The computerized method of claim 2, wherein each participant of the N-tier network shares data with individual or multiple participants across multiple tiers.

4. The computerized method of claim 3, wherein data-sharing rules can be encoded to ensure direct and targeted tier-aware communications and reduce information latency through automation.

5. The computerized method of claim 4, wherein the blockchain ledger serves as a common decentralized store for verifiable, immutable data.

6. The computerized method of claim 2 further comprising:
   with the blockchain-enabled secure information payload packet SIPP technology, setting up a hyper-connected data network that comprises a plurality of modalities of data sharing between network members in a tier-aware manner.

7. The computerized method of claim 6, wherein a plurality of participants use the blockchain-enabled secure information payload packet SIPP technology to share data.

8. The computerized method of claim 7 further comprising:
   recording data in the common blockchain ledger.

9. The computerized method of claim 8, wherein the common blockchain ledger serves as the common decentralized store for verifiable, immutable data.

10. The computerized method of claim 9 further comprising:
    encoding a set of data-sharing rules can be encoded to ensure direct and targeted tier-aware communication and reduce information latency through automation.

11. The computerized method of claim 1, wherein the SDV is implemented by:
    creating a private, permissioned network of suppliers that are registered and approved to join the network, based on verifiable qualification data; and
    providing security and privacy across the network via a plurality of rules-based permission and access controls that are entity and tier-aware.

12. The computerized method of claim 11, wherein the SDV provides direct and granular control for each entity to manage what specific data or data sets that are shared.

13. The computerized method of claim 12, wherein the SDV provides a mechanism to combine any data field with another data field and create sharable custom data sets.

14. The computerized method of claim 13, wherein a plurality of Zero Knowledge Proof (ZKP) protocols verify a set of business facts without requiring participants to share or reveal actual data.

15. The computerized method of claim 14, wherein the SDV encapsulates data within each SIPP token.

16. The computerized method of claim 1,
    wherein the SUT context uses a programmatic consensus mechanism to ensure that only data approved by all relevant nodes in the network is shared across the network,
    wherein with SIPP technology, the SUT context securely packages the approved data into a plurality of SUT tokens that are specifically addressed to every supplier in the chain requesting their response, and
    wherein a demand signal of the securely packaged approved data is personalized and translated for each supplier of the plurality of supply chains.

17. The computerized method of claim 16, wherein the approved data is recorded on the common blockchain ledger with verifiable proof.

18. The computerized method of claim 16, wherein the approved data is recorded on the common blockchain ledger with verifiable proof.

19. The computerized method of claim 17, wherein a Universal Digital Wallet uses the SIPP technology to store all information securely, including information they need to interact with and pay for various online and offline services securely.

20. The computerized method of claim 18, wherein there is a secure digital, multi-purpose Universal Digital Wallet.

* * * * *